United States Patent
Shibata et al.

(10) Patent No.: US 9,293,760 B2
(45) Date of Patent: Mar. 22, 2016

(54) BATTERY, MANUFACTURING METHOD OF THE SAME, AND MANUFACTURING APPARATUS OF THE SAME

(75) Inventors: Daisuke Shibata, Tokai (JP); Kazuo Ikuta, Kariya (JP); Masaya Nakamura, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 476 days.

(21) Appl. No.: 13/482,218

(22) Filed: May 29, 2012

(65) Prior Publication Data

US 2012/0308862 A1    Dec. 6, 2012

(30) Foreign Application Priority Data

May 30, 2011   (JP) .................................. 2011-120779

(51) Int. Cl.
| | |
|---|---|
| *H01M 4/04* | (2006.01) |
| *H01M 4/13* | (2010.01) |
| *H01M 4/139* | (2010.01) |
| *H01M 10/04* | (2006.01) |
| *H01M 4/02* | (2006.01) |

(52) U.S. Cl.
CPC .............. *H01M 4/0404* (2013.01); *H01M 4/13* (2013.01); *H01M 4/139* (2013.01); *H01M 10/0431* (2013.01); *H01M 10/0436* (2013.01); *H01M 2004/021* (2013.01); *Y02E 60/122* (2013.01); *Y02P 70/54* (2015.11); *Y10T 29/49115* (2015.01)

(58) Field of Classification Search
CPC .......................................... H01M 4/04–4/0435
See application file for complete search history.

(56) References Cited

U.S. PATENT DOCUMENTS

| 6,485,865 B1* | 11/2002 | Sugikawa ............... B22F 7/002 29/2 |
|---|---|---|
| 2006/0234115 A1 | 10/2006 | Watanabe et al. |
| 2009/0142659 A1* | 6/2009 | Lai et al. ....................... 429/163 |
| 2009/0170004 A1* | 7/2009 | Okawa ................ H01M 4/0404 429/233 |
| 2010/0099029 A1* | 4/2010 | Kinoshita et al. ............. 429/316 |
| 2010/0151321 A1* | 6/2010 | Yamamoto .............. H01M 4/04 429/218.1 |

(Continued)

FOREIGN PATENT DOCUMENTS

| JP | 03-084855 | 4/1991 |
|---|---|---|
| JP | 04-206149 | 7/1992 |

(Continued)

OTHER PUBLICATIONS

Machine Translation of JP 07-263000 (Oct. 1995).*

(Continued)

*Primary Examiner* — Jonathan Crepeau
*Assistant Examiner* — Jacob Buchanan
(74) *Attorney, Agent, or Firm* — Harness, Dickey & Pierce, P.L.C.

(57) ABSTRACT

A battery includes a positive plate, a negative plate and an insulative separator disposed between the positive plate and the negative plate. Each of the positive plate and the negative plate has a collector and an electrode layer disposed on a surface of the collector. The electrode layer contains an active material. At least one of the positive plate and the negative plate has cracks in a whole area of the electrode layer thereof or at a part of the electrode layer thereof, the part being away from a connector of the one to be coupled to an electrode at least by a predetermined distance. For example, the cracks are formed by drying the electrode layer at a predetermined drying rate.

12 Claims, 9 Drawing Sheets

(56) References Cited

U.S. PATENT DOCUMENTS

| | | | |
|---|---|---|---|
| 2010/0227210 A1* | 9/2010 | Fukunaga | C04B 35/522 |
| | | | 429/129 |
| 2010/0310926 A1* | 12/2010 | Wang et al. | 429/164 |
| 2011/0129736 A1* | 6/2011 | Muraoka et al. | 429/245 |
| 2014/0127557 A1* | 5/2014 | Kasahara | H01M 4/134 |
| | | | 429/163 |

FOREIGN PATENT DOCUMENTS

| | | | | |
|---|---|---|---|---|
| JP | 07-263000 | 10/1995 | | |
| JP | 2000208147 A * | 7/2000 | | H01M 4/62 |
| JP | 2008-243656 | 10/2008 | | |
| JP | 2010-251047 | 11/2010 | | |
| WO | WO 2010086913 A1 * | 8/2010 | | H01M 4/66 |
| WO | WO 2012/169282 * | 12/2012 | | H01M 4/134 |

OTHER PUBLICATIONS

Machine Translation of JP 2000-208147 (Jul. 2000).*
Office action dated Aug. 20, 2013 in corresponding Japanese Application No. 2011-120779.

* cited by examiner

BATTERY, MANUFACTURING METHOD OF THE SAME, AND MANUFACTURING APPARATUS OF THE SAME

CROSS REFERENCE TO RELATED APPLICATION

This application is based on Japanese Patent Application No. 2011-120779 filed on May 30, 2011, the disclosure of which is incorporated herein by reference.

TECHNICAL FIELD

The present disclosure relates to a battery having a positive plate, a negative plate and a separator, a manufacturing method of the battery, and a manufacturing apparatus of the battery.

BACKGROUND

An example of a technology related to a non-aqueous electrolyte secondary battery electrode aiming to retain a sufficient quantity of an electrolytic solution in an electrode, inhibit liquid depletion and Li ion depletion accompanying charge and discharge, and secure sufficient capacity and input/output is described in JP2006-294512A, corresponding to US2006/0234115A1, for example. The described non-aqueous electrolyte secondary battery electrode has many cracks extending in the direction intersecting with a winding direction and having a depth ranging from the surface of a mixture layer to a part in contact with a collector. The cracks are formed by curving an electrode in the longitudinal direction by turning the transfer direction with a plurality of rotatable rollers while a tension is applied to the electrode during the process of transferring the electrode in the longitudinal direction.

Further, an example of a technology related to a battery aiming at the improvement of an immersion efficiency (operability) and the inhibition of liquid leakage is described in JP07-263000A, for example. In the battery, cracks are generated on the surface and in the interior of an electrode by forcibly drying it after a composite positive electrode and a composite negative electrode are applied by coating. Examples of the cracks generated by forcible drying are hair cracks, shallow cracks, crazing, deep cracks, etc.

SUMMARY

In a technology where an electrode is bent using multiple rollers having different diameters, as described in JP2006-294512A, the manufacturing cost increases. Further, since the electrode is bent with the multiple rollers in sequence, not only there will be the possibility that cracks are generated also in a collector itself in accordance with the strength of the collector but also the strength and durability of the electrode will deteriorate.

In the technology described in JP07-263000A, which cracks of hair cracks, shallow cracks, crazing, and deep cracks are generated are not obvious. Furthermore, a process, a control method, etc. for generating intended cracks are also not obvious.

It is an object of the present disclosure to provide a battery having a collector with sufficient strength and durability, a manufacturing method of the battery, and a manufacturing apparatus of the battery.

According to an aspect of the present disclosure, a battery includes a positive plate, a negative plate and an insulative separator disposed between the positive plate and the negative plate. Each of the positive plate and the negative plate includes a collector and an electrode layer disposed on at least one surface of the collector. The electrode layer containing an active material. At least one of the positive plate and the negative plate has cracks in a whole area of the electrode layer thereof.

In such a structure, the cracks generated by drying do not affect the collector, it is possible to secure strength and durability of the collector.

According to another aspect of the present disclosure, a battery includes a positive plate, a negative plate and an insulative separator disposed between the positive plate and the negative plate. Each of the positive plate and the negative plate includes a collector and an electrode layer disposed on at least one surface of the collector. The electrode layer containing an active material. At least one of the positive plate and the negative plate has cracks at a part of the electrode layer thereof, the part being away from a connector of the corresponding one of the positive plate and the negative plate to be coupled to an electrode at least by a predetermined distance.

Also in such a structure, the cracks generated by drying do not affect the collector, it is possible to secure strength and durability of the collector.

In a method of manufacturing a battery, an electrode layer containing an active material is deposited on a surface of a collector of at least one of a positive plate and a negative plate, and the electrode layer is dried at a predetermined drying rate to form cracks in the corresponding electrode layer.

In such a method, the cracks are positively formed by the drying. The cracks generated by the drying do not affect the collector and hence the strength and durability of the collector can be secured.

The battery is formed by a manufacturing apparatus including a crack forming unit. The crack forming unit dries the electrode layer at a predetermined drying rate to form the cracks in the electrode layer. By such an apparatus, the cracks are positively formed by the crack forming unit. The cracks generated by the drying do not affect the collector and hence the strength and durability of the collector can be secured.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Exemplary embodiments of the present disclosure the will be hereunder explained in reference to the drawings. Here, unless otherwise specified, when the term "couple" is used, that means electrical connection. When the directions of right, left, top, and bottom are mentioned, those are based on the directions in the relevant drawing. A "material" includes a matter. When the term "electrode plate" is simply described, it means either or both of a positive plate and a negative plate.

First Embodiment

Figure 1A:
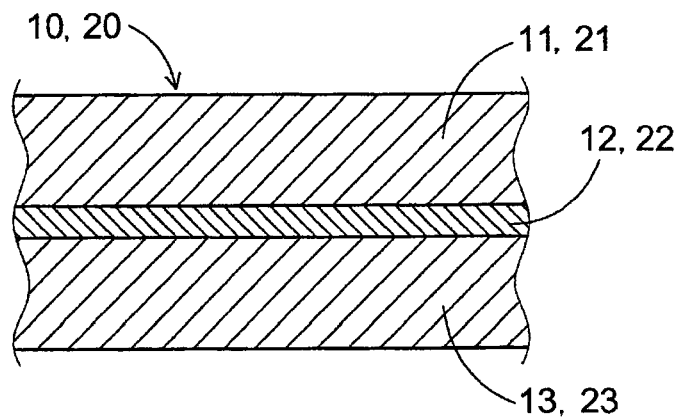
FIG. 1A is a sectional view of a part of an electrode plate of a battery, before drying, according to a first embodiment.

A first embodiment is an example of a wound type battery to which the present disclosure is applied and is explained in reference to FIGS. 1A to 9. Firstly, configuration examples of a band-shaped electrode plate acting as the base of a wound type battery are explained in reference to FIGS. 1A to 1C, and 2A to 2C. A configuration example of an electrode plate is schematically shown in FIGS. 1A to 1C. FIG. 1A is a sectional view an electrode plate before being dried. FIG. 1B is a sectional view of the electrode plate after cracks are formed by drying. FIG. 1C is a sectional view of the electrode plate after being pressed. FIG. 2A is a plan view of an example of an electrode plate in which cracks are formed in the whole area of an electrode layer. FIG. 2B is a plan view of an example of an electrode plate in which cracks are formed at a part (band-shaped center part) of the electrode plate. In FIGS. 2A to 2C, a site where the cracks are formed is shaded (i.e., dotted) in order to make it understandable.

Figure 1B:
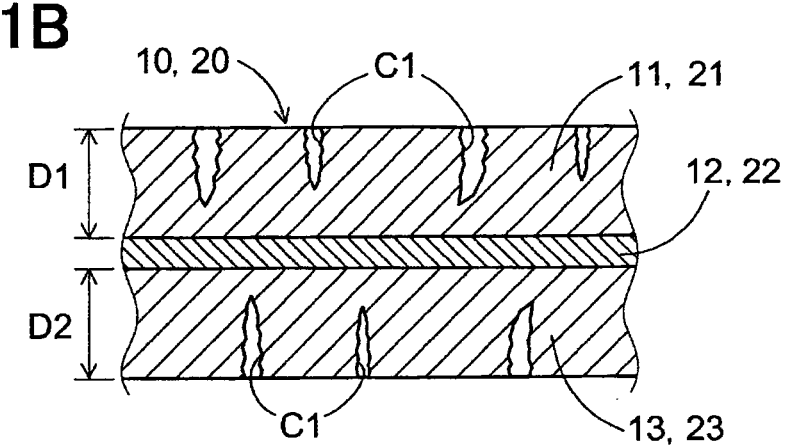
FIG. 1B is a sectional view of the part of the electrode plate, after the drying, according to the first embodiment.
Figure 1C:
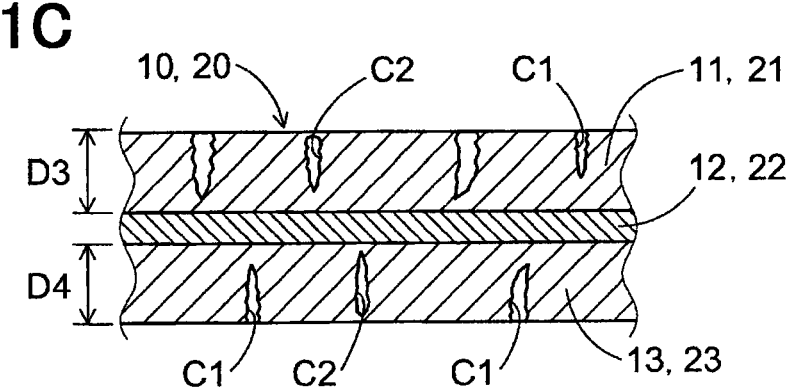
FIG. 1C is a sectional view of the part of the electrode plate, after pressing, according to the first embodiment.

A battery has an electrode body. In a wound type battery, the electrode body is obtained by winding band-shaped electrode plates such as a positive plate and a negative plate into a coil with an insulative separator and further pressing the wound electrode plates into a substantially flat shape. In the wound type battery, therefore, the electrode body is also referred to as a flat body. FIGS. 1A to 1C show a part of the band-shaped electrode plate before winding. The difference between the positive plate and the negative plate in the wound type battery is whether a plate is positive or negative. Consequently, explanations are made on the basis of the positive plate and, with regard to the negative plate, contents different from the positive plate are explained.

In a positive plate 10 shown in FIG. 1A, positive layers 11 and 13 are formed over the surfaces of a band-shaped positive collector 12. The positive collector 12 is formed into a band shape with an electrically conductive material, such as a metal or an electrically conductive plastic. The thickness of the positive collector 12 is set in conformity with the specification, such as a capacitance and an outside dimension, of a manufactured wound type battery and is about 5 to 300 µm for example. The thickness of a negative plate 20 may be either identical to or different from the positive plate 10. The same goes for a shape and a foil shape, a tabular shape, a reticular shape, or the like can be adopted for example. For example, the positive layer 11 is disposed on the surface of the positive collector 12, which corresponds to the outer circumference side after winding, and the positive layer 13 is disposed on the opposite surface of the positive collector 12, which corresponds to the inner circumference side after winding.

The positive layers 11 and 13 are made of a material such as a metallic sulfide, a metallic oxide, or a high molecular compound that can occlude and disengage light metal ions such as lithium ions. With regard to the negative plate 20, negative layers 21 and 23 formed over the surfaces of a negative collector 22 is made of a light metal such as lithium or sodium, an alloy containing such a light metal, or a material that can occlude and disengage a light metal. For example, all the electrode layers, such as the positive layers 11 and 13 and the negative layers 21 and 23, contain a fibrous conductive material.

To form the positive plate 10, paste-like positive layers 11 and 13 are formed (applied) over the surfaces of the positive collector 12. After applying the paste-like positive layers 11 and 13, many cracks C1 are positively generated in the positive layers 11 and 13 as shown in FIG. 1B by drying. The aspect such as size, length, depth of the cracks C1 can be controlled by appropriately controlling a drying rate and the like. The control of the drying rate and the like is hereinafter described with reference to FIGS. 4A to 4D and 6.

After drying the paste-like positive layers 11 and 13, the positive plate 10 is pressed in a top and bottom direction. Thus, a structure shown in FIG. 1C is obtained. When the positive plate 10 is compressed, the thickness D1 of the positive layer 11 is reduced to the thickness D3 (D3<D1) and the thickness D2 of the positive layer 13 is reduced to the thickness D4 (D4<D2). Those thicknesses D1 to D4 can be arbitrarily set. Ends of the cracks C1, which are open at the surfaces of the dried positive layers 11 and 21, are closed in accordance with the pressing and thus cracks C2 having closed ends and existing only internal spaces of the positive layers 11 and 13 are generated. The cracks C2 are also referred to as internal cracks.

Figure 2A:
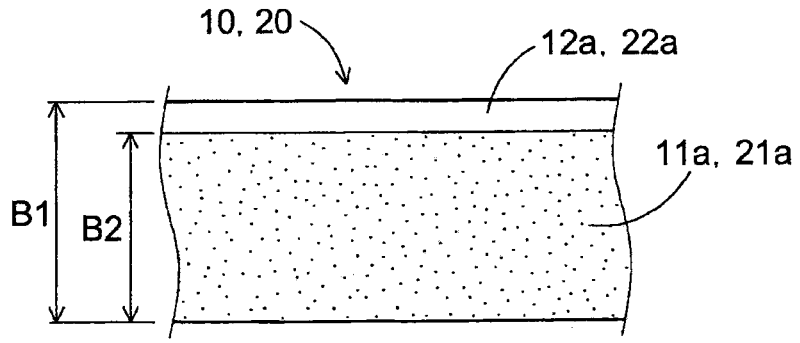
FIG. 2A is a plan view of the part of the electrode plate for illustrating an example of a crack forming part, according to the first embodiment.
Figure 2B:
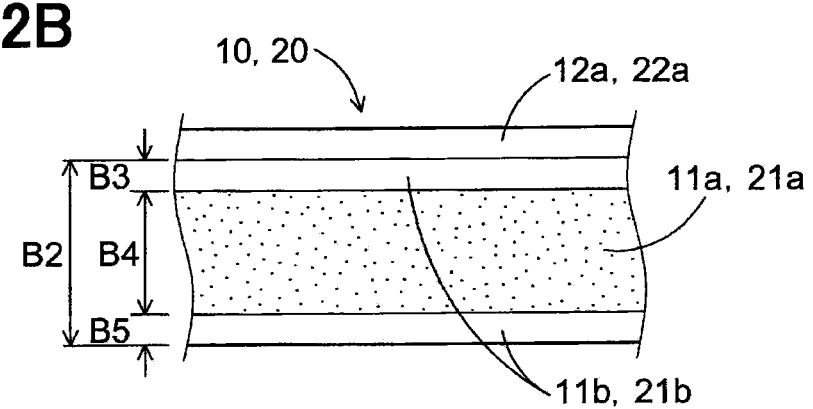
FIG. 2B is a plan view of the part of the electrode plate for illustrating another example of the crack forming part, according to the first embodiment.
Figure 2C:
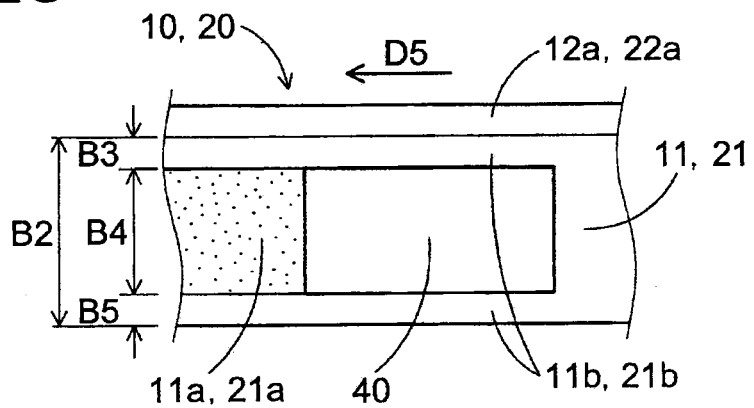
FIG. 2C is a plan view of the part of the electrode plate for illustrating a crack forming method of the electrode plate shown in FIG. 2B according to the first embodiment.

A site where the cracks C1 and C2 are formed can be arbitrarily set. As the site where the cracks C1 and C2 are formed increases in the positive plate 10, liquid depletion and ion depletion are more restricted. Examples of the site where the cracks C1 and C2 are formed are shown in FIGS. 2A to 2C. FIGS. 2A and 2B are plan views of the positive plate 10, when viewed from the top of FIG. 1B, such as viewed from the positive layer 11. The same goes for the opposite surface, such as the positive layer 13, and hence explanations are made hereunder on the basis of the positive layer 11.

In an example of FIG. 2A, the cracks C1 and C2 are formed in the whole area of the positive layer 11. The band-shaped positive plate 10 (electrode width B1) shown in FIG. 2A has a crack forming part 11a (active material forming width B2) where the cracks C1 and C2 are formed, a collector exposed part 12a, and the like. The crack forming part 11a corresponds to the whole area where the positive layer 11 is formed over the surface of the positive collector 12. The collector exposed part 12a corresponds to a "connection coupled to an electrode" and is used as a positive electrode. The positive electrode is formed by exposing the positive collector 12 at the collector exposed part 12a without forming the positive layer 11, and by coupling the collector exposed parts 12a in the flat body after winding and flattening-pressing, which will be described hereinafter with reference to FIG. 3. The same goes for the negative collector 22 of the negative plate 20. That is, the collector exposed parts 22a of the negative collector 22 are coupled to each other and used as a negative electrode.

In an example of FIG. 2B, the cracks C1 and C2 are formed in a part (almost whole area) of the positive layer 11. The band-shaped positive plate 10 shown in FIG. 2B has a crack non-forming part 11b in addition to the crack forming part 11a and the collector exposed part 12a. The crack forming part 11a (crack forming width B4) corresponds to the part of the positive layer 11 excluding the crack non-forming part 11b. In other words, the crack forming part 11a corresponds to the center region of the band-shaped positive plate 10. The crack non-forming part 11b (crack non-forming widths B3 and B5) is a region where cracks are not formed in the positive layer 11. In other words, the crack forming part 11a is apart from the collector exposed part 12a by a predetermined distance (namely crack non-forming widths B3).

The positive plate 10 shown in FIG. 2B can be manufactured by the configuration shown in FIG. 2C for example. That is, the band-shaped positive plate 10 in which the positive layer 11 is already formed (applied) is transferred to a predetermined direction (direction of the arrow D5 for example) and the positive layer 11 is dried with a drying unit 40 that is separately disposed at a position corresponding to the crack forming part 11a. That is, the cracks C1 are formed by heating and drying the center part of the positive plate 10 in the width direction.

The drying unit 40 corresponds to a "crack forming unit." As the drying unit 40, an arbitrary means or device for drying the positive layer 11 can be applied. Examples are an electrically heated wire, a gas burner, and a warm air blower. FIG. 2C is an example of disposing the drying unit 40 having a width corresponding to the crack forming width B4. The positive plate 10 shown in FIG. 2A can be manufactured by disposing the drying unit 40 having a width corresponding to the active material forming width B2.

Figure 7:
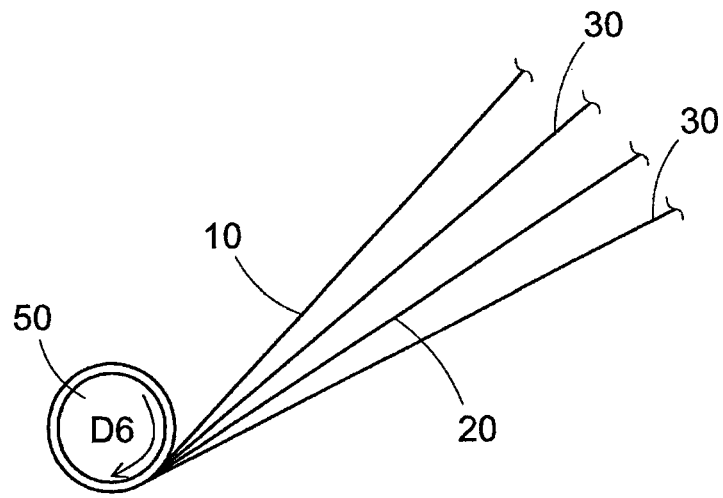
FIG. 7 is a schematic side view for illustrating an example of a winding step according to the first embodiment.
Figure 8:
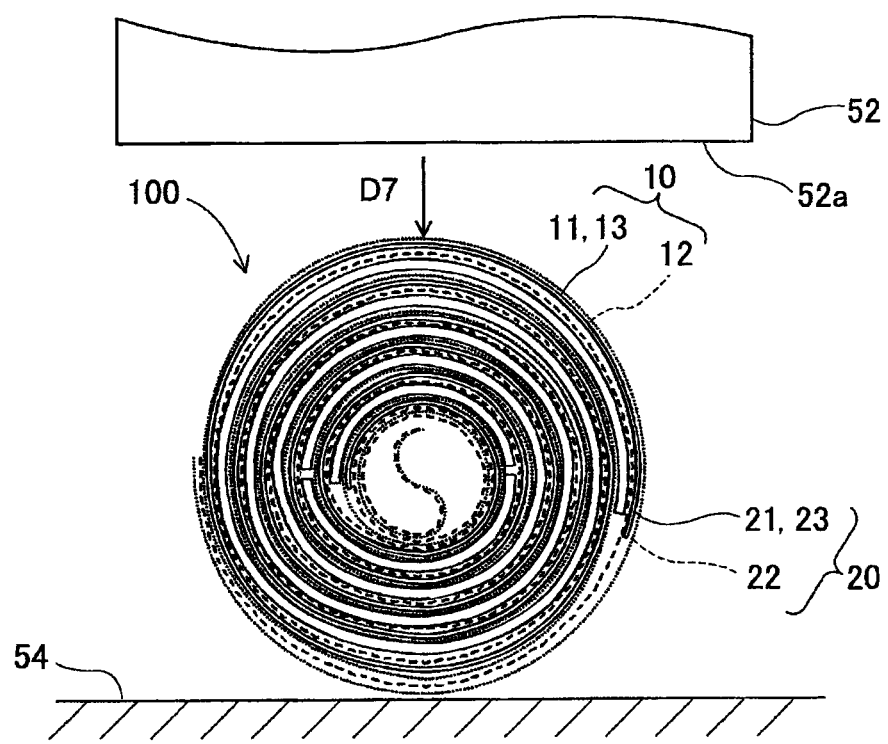
FIG. 8 is a side view showing an example of a flattening-pressing step according to the first embodiment.
Figure 9:
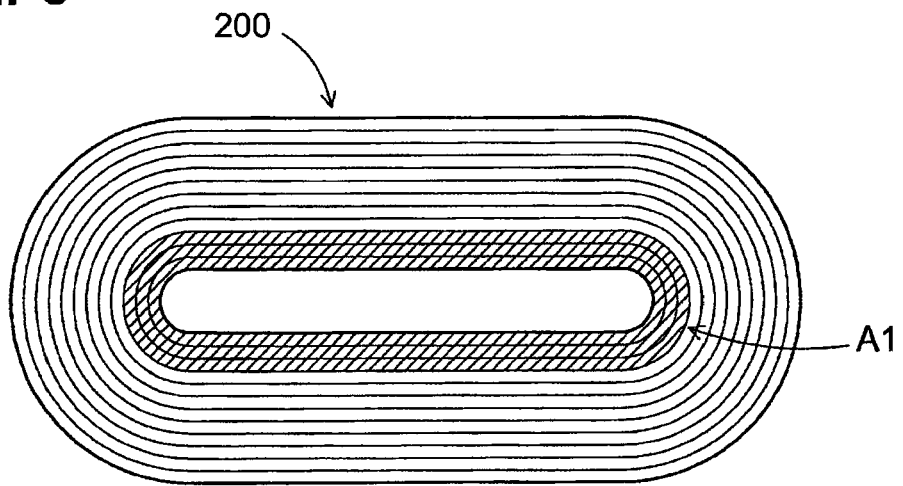
FIG. 9 is a schematic side view of an electrode body of the wound type battery for illustrating a crack forming site according to the first embodiment.

The flat body 200 shown in FIG. 9 is formed by winding the positive plate 10 and the negative plate 20 where the cracks C1 and C2 are formed as described above while interposing an insulative separator 30 between the positive plate 10 and the negative plate 20 as shown in FIG. 7 and further flattening-pressing the wound body as shown in FIG. 8.

Figure 3:
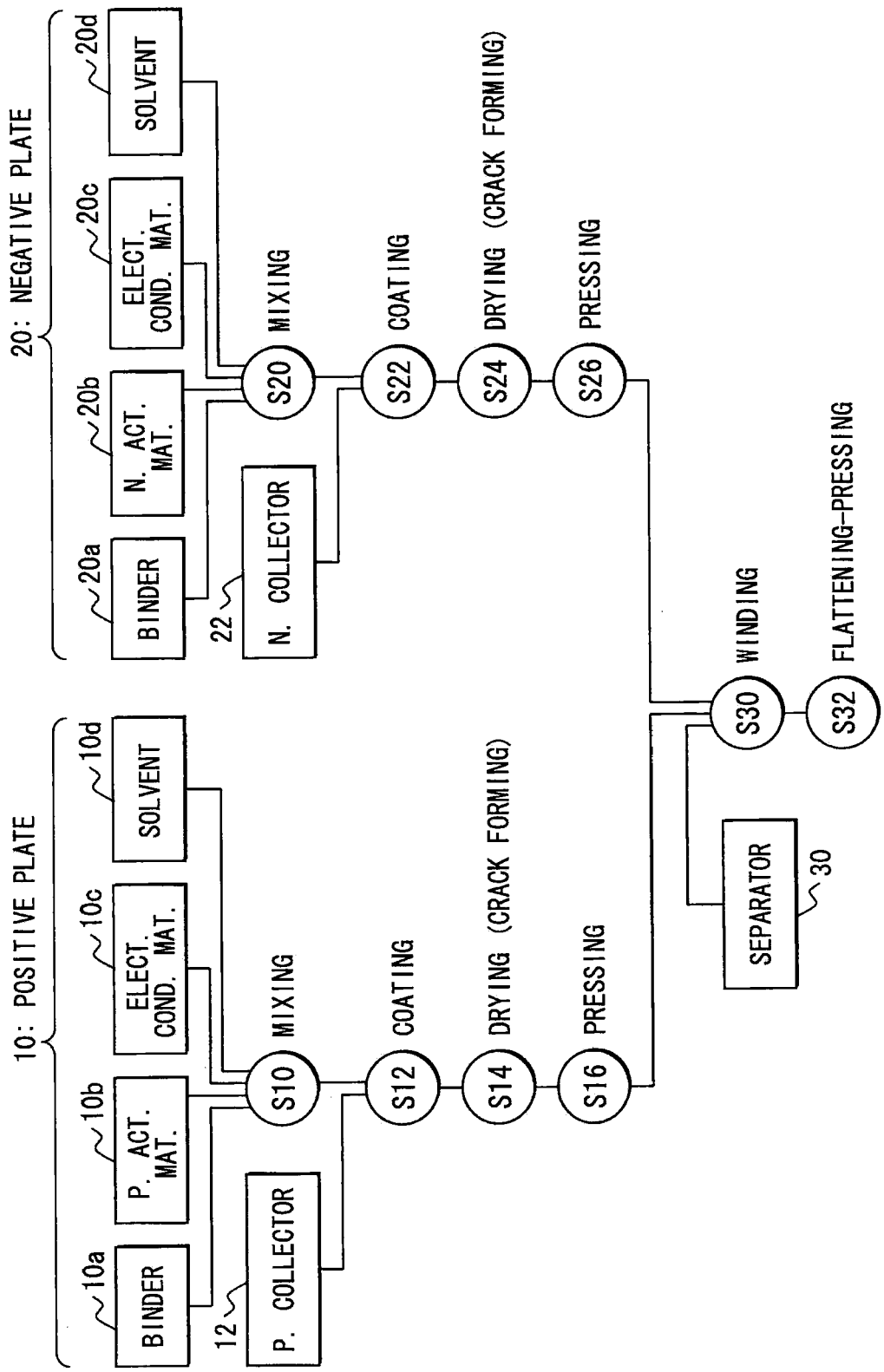
FIG. 3 is a flowchart illustrating a manufacturing method of a wound type battery according to the first embodiment.

Processes for manufacturing the wound type battery by winding the positive plate 10, the negative plate 20, the separator 30, and the like, those having a band shape, are explained hereunder in reference to the flowchart shown in FIG. 3. The manufacturing method shown in FIG. 3 generally includes a first process of forming the positive plate 10, a second process of forming the negative plate 20, and the third process of stacking the positive plate 10 and the negative plate 20 through the separator 30, winding a stacked body into a coil shape and flattening-pressing the coil shape to form the flat body 200.

The first to third processes are hereunder explained in sequence but the first process and the second process may be carried out in random order. In each of the first and second processes, coating (S12, S22), drying (S14, S24), and pressing (S16, S26) are carried out in this order but may be applied to either a part or the whole of the electrode plate in accordance with conditions such as a material, a shape, and others. In the former case (applied to a part of the electrode plate), after a mixed material is formed (applied) over the surfaces of the collector as the electrode layers, the drying and the pressing are successively performed. In the latter case (applied to the whole of the electrode plate), after a mixed material is formed (applied) over the whole surfaces of the collector as the electrode layers, the drying is performed to the whole electrode plate and the pressing is performed to the whole electrode plate.

First Process (Process of Forming Positive Plate 10)

Firstly, mixing is performed at S10. Namely, a mixed material for positive layers 11 and 13 is formed. The mixed material is a substance produced by mixing a binder 10a, a positive active material 10b, an electrically conductive material 10c, a solvent 10d, and the like into a paste (or a liquid).

Any binder can be used as the binder 10a. Examples are polyvinylidene fluoride (PVDF), a denatured body of polyvinylidene fluoride, polytetrafluoroethylene (PTFE), and a rubber particle binder having an acrylate unit. Here, acrylate monomer or acrylate oligomer, each of which introduces a reactive functional group, may also be added.

The positive active material 10b is made of a material capable of occluding and disengaging light metal ions such as lithium ions for example. Concrete examples are a metallic sulfide, a metallic oxide, and a high molecular compound. Examples of the metallic sulfide and the metallic oxide are substances, such as titanium sulfide ($TiS_2$), molybdenum sulfide ($MoS_2$), niobium selenide ($NbSe_2$), and vanadium oxide ($V_2O_5$), not containing lithium. Examples of the metallic oxide are, besides the aforementioned substances without containing lithium, lithium composite oxide represented by $Li_xMO_y$ and the like. Here, M is one or more metallic elements selected from the group of cobalt (Co), nickel (Ni), manganese (Mn), iron (Fe), zinc (Zn), chromium (Cr), aluminum (Al), titanium (Ti), and silicon (Si) or a nonmetallic element such as phosphor (P) or boron (B), and a combination of two or more of those elements may also be used. With regard to the suffixes in the composition formula, it is desirable that x is set in the range of $0.05 \leq x \leq 2.0$ and y is set in the range of $2 \leq y \leq 4$, respectively.

As the positive active material 10b, from demand characteristics such as a high potential, a high capacitance, and durability, a lithium composite oxide such as a lithium and iron composite oxide, a lithium and cobalt composite oxide, or a lithium and nickel oxide is selected. A combination of two or more kinds of the metallic sulfide and metallic oxide, those being described above, may also be used. The material used for the positive active material 10b can be selected arbitrarily in accordance with the type, the application, and others of a battery.

As the electrically conductive material 10c, any material can be used as long as it is an electrically conductive material (including an electrically conductive composite material). For example, a fibrous conductive material is employed in order to electrically couple even between the positive layers 11 and 13 where the cracks C1 and C2 are generated by drying. Examples are carbon fiber, fibrous carbon black, etc. The former carbon fiber includes a carbon nanotube (CNT), a vapor grown carbon fiber (also called "crystalline carbon fiber," VGCF) that is a type of the carbon nanotube, and others. When the latter carbon black is used, it is desirable that it has a high specific surface area of 30 m²/g or more as a specific surface area by a BET method.

As the solvent 10*d*, a substance suitable for mixing is used. Examples are: single solvents such as N-methyl-2-pyrrolidone (NMP), 1,2-dimethoxyethane, 1,2-diethoxyethane, propylene carbonate, butylene carbonate, ethylene carbonate, γ-butyrolactone, tetrahydrofuran, 1,3-dioxolane, diethyl carbonate, dimethyl carbonate, and ethylmethyl carbonate; and a mixed solvent produced by selecting and blending two or more kinds of those solvents.

At S12, the coating is performed. Namely, in the coating, the mixed material produced at the S10 are applied on the surfaces of the positive collector 12 as the positive layers 11 and 13. Specifically, the positive layers 11 and 13 are formed on the surfaces of the positive collector 12 by applying the mixed material by a predetermined forming method. Examples of the predetermined forming method are blade coating, Comma coating, die coating, transcription, extrusion, painting (including daubing and spraying), and vapor deposition. The thicknesses of the positive layers 11 and 13 (thicknesses D1 to D4 shown in FIGS. 1B and 1C) are adjusted so as to be 10 to 200 μm per one side for example. Here, the thickness of the positive collector 12 is about 5 to 30 μm for example. The band-shaped positive plate 10 is formed in this way.

Figure 5:
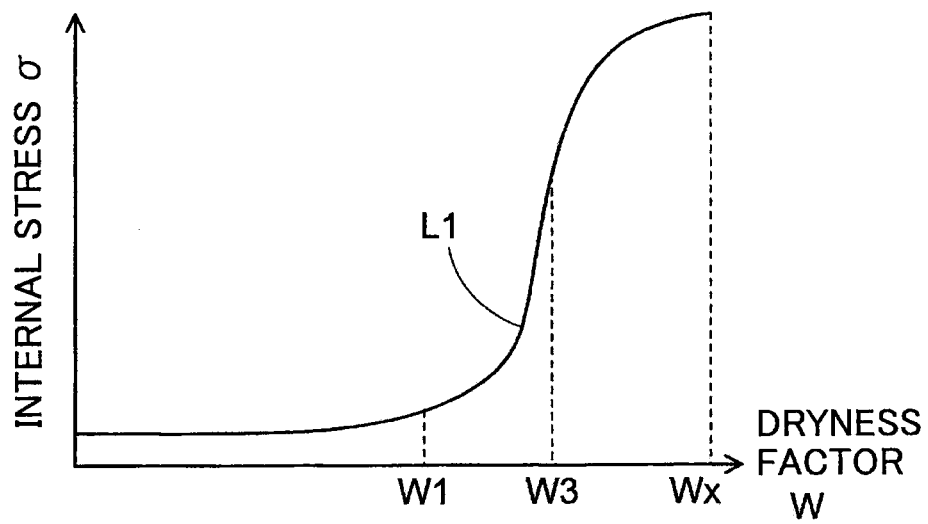
FIG. 5 is a graph illustrating a relationship between a dryness factor and an internal stress according to the first embodiment.
Figure 6:
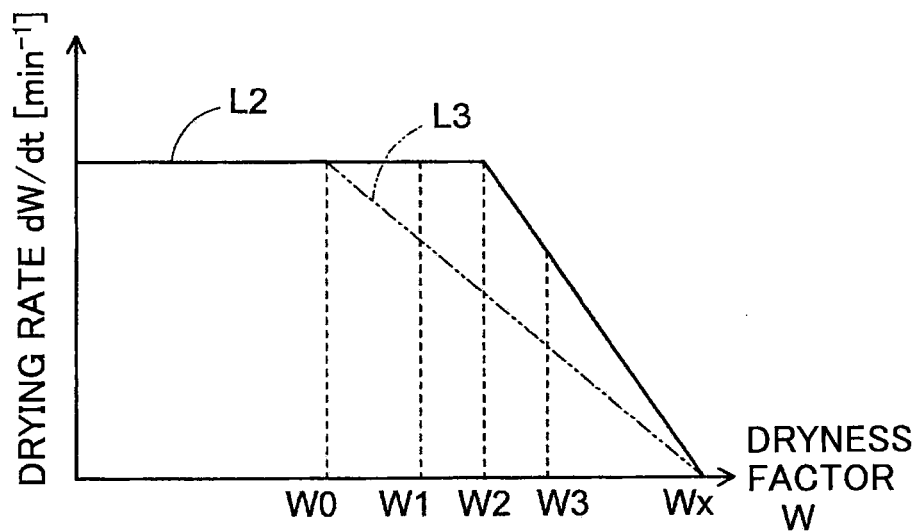
FIG. 6 is a graph illustrating a relationship between a dryness factor and a drying rate according to the first embodiment.

After the positive layers 11 and 13 are formed on the surfaces of the positive collector 12, the drying is performed at S14. Namely, the positive layers 11 and 13 are dried in order to generate the cracks C1 as shown in FIG. 1B. The transformation of the positive layers 11 and 13 in the drying is explained in reference to FIGS. 4A to 4D, 5 and 6. FIGS. 4A to 4D schematically show a process of forming cracks. In FIGS. 4A to 4D, an example of forming only the positive layer 11 on one surface of the positive collector 12 is shown in order to make it understandable. FIG. 5 graphically shows the relationship between an internal stress and a dryness factor. FIG. 6 graphically shows the relationship between a drying rate and a dryness factor.

Figure 4A:
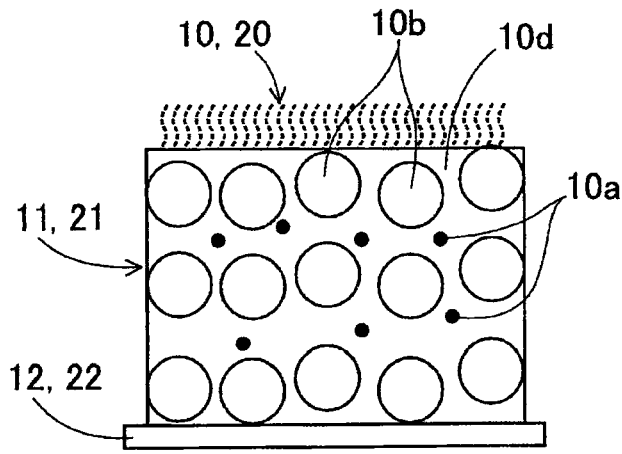
FIGS. 4A, 4B, 4C and 4D are schematic views for illustrating a process of forming cracks in the electrode plate according to the first embodiment.
Figure 4B:
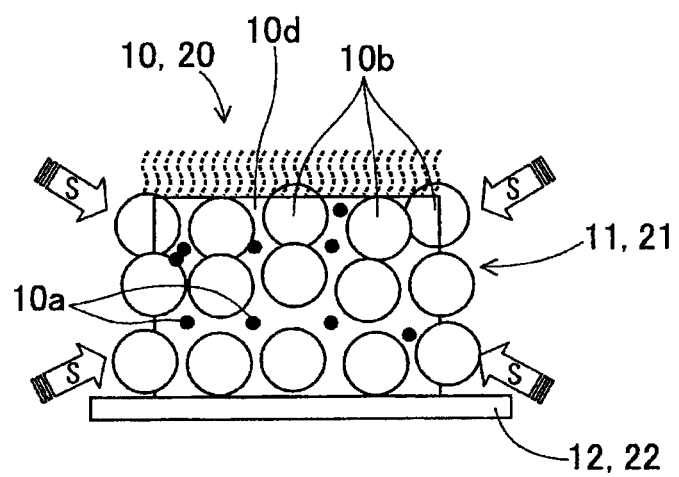
Figure 4C:
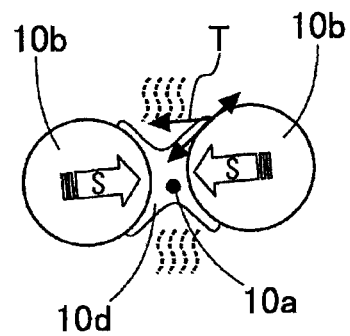
Figure 4D:
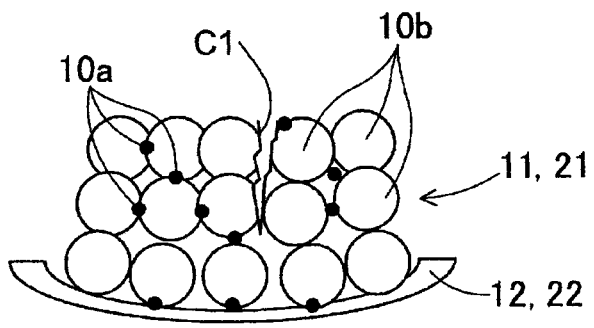

The positive layers 11 and 13 applied on the surfaces of the positive collector 12 through the S12 are in a state shown in FIG. 4A because the active material 10*b*, the electrically conductive material 10*c*, the binder 10*a*, and the like are dispersed in the solvent 10*d*. When the drying is performed in the state, the solvent 10*d* evaporates and hence a state shown in FIG. 4B is obtained. In the state shown in FIG. 4B, stresses are generated from many directions as shown by arrows S in accordance with gradual narrowing of the interval between particles of the positive active material 10*b*. Looking precisely as shown in FIG. 4C, a tensile stress shown by the arrows S is generated at the solid-liquid-gas interface on the surfaces of the particles of the positive active material 10*b*. When the tensile stress is generated, parts strong in binding force and parts weak in binding force are generated between particles of the positive active material 10*b*. When the solvent 10*d* evaporates further, the parts weak in binding force cannot keep the bond and the cracks C1 are generated as shown in FIG. 4D. It is desirable that the cracks C1 satisfy one of or both of a first characteristic and a second characteristic, which are described below.

The first characteristic is to control the maximum width between the cracks C1 in the range of 2 to 10 times the average particle diameter of the positive layers 11 and 13. The reason is that, if the maximum width is less than 2 times, the interval is simply the same level as voids between particles and hence it is difficult to inhibit liquid depletion and ion depletion. On the other hand, if the maximum width exceeds 10 times, physical defects are presumably generated and inversely it is concerned that electrode exfoliation and others are caused and battery performance is hindered.

The second characteristic is to control a planar direction total crack length of the cracks C1 so as to be in the range of 0.1 to 1.0 cm/cm² in the planar direction of the positive plate 10. The reason is that, if the planar direction total crack length is less than 0.1 cm/cm², the quantities of a non-aqueous electrolyte and an electrolytic solution which are capable of intruding into cracks decrease and the effect against liquid depletion and ion depletion is not obtained sufficiently. On the other hand, if the planar direction total crack length exceeds 1.0 cm/cm², strength as the electrode is insufficient and inversely it is concerned that electrode exfoliation and others are caused and battery performance (durability in particular) is negatively influenced.

Control methods with regard to the generation of the cracks C1 shown in FIG. 4D are studied. Firstly, there is generally a relationship shown in FIG. 5 between an internal stress and a dryness factor. In FIG. 5, an internal stress σ is shown along the vertical axis, a dryness factor W is shown along the horizontal axis, and the change of the internal stress σ with the increase of the dryness factor W is shown as a characteristic line L1. The dryness factor W means a solid content concentration in the positive layers 11 and 13. When the proportion of the solvent 10*d* is defines as "X," the expression W=1−X is obtained.

In FIG. 5, as the characteristic line L1 (solid line) shows, the internal stress σ increases as the dryness factor W increases. Up to the dryness factor W1 (about 70% for example), the internal stress σ does not change much because the solvent 10*d* evaporates as shown in FIG. 4A. The internal stress σ increases gradually when the dryness factor exceeds W1 and increases exponentially from around the dryness factor W3 (about 80% for example). This is because decreasing rate of drying is caused by the influences of stresses shown by the arrows S due to contraction accompanying the reduction of the solvent 10*d* itself as shown in FIG. 4B and the surface tension of the solvent 10*d* shown by arrows T in FIG. 4C. In this way, exponential increase of the internal stress σ causes the cracks C1 shown in FIG. 4D to be generated. Then the internal stress σ reaches the maximum value when the dryness factor is Wx (100%) and complete drying is attained.

For example, the drying is performed in accordance with drying control shown in FIG. 6 in order to generate the cracks C1 and C2 satisfying the first and second characteristics in the positive layers 11 and 13. In FIG. 6, a drying condition (e.g., drying rate dw/dt (min⁻¹)) is shown along the vertical axis, a dryness factor W (%) is shown along the horizontal axis, and drying control is shown as a characteristic line L2. According to the characteristic line L2, the drying is performed while the drying rate dw/dt is set at a nearly constant value after the commencement of the drying to the dryness factor W2 (about 85% for example) between the dryness factors W1 and W3. Since the internal stress σ increases exponentially when the dryness factor exceeds W1 as described above, the drying rate dw/dt decreases gradually from the dryness factor W2 to the dryness factor Wx (100%).

The drying rate dw/dt at the time when the dryness factor exceeds W2 is adjusted appropriately in accordance with the planar direction total crack length, the quantity of formed cracks C2 (internal cracks), and the like. The planar direction total crack length can be computed by preparing an imaging unit (a CCD camera for example) to image the surfaces of positive layers 11 and 13 and an image processing analytical unit to binarize obtained image data and carry out image analysis on the basis of the binarized data. The quantity of the formed cracks C2 can be obtained likewise by taking a picture of a fracture cross-section of an electrode processed at a cross section with an ion beam or frozen with liquid nitrogen or the like. In this way, the cracks C1 are appropriately formed in the positive layers 11 and 13 of the positive plate 10.

At S16, the pressing is performed. Namely, the positive plate 10 is pressed with a press machine (a roller for example) after the drying of S14 is finished. Some of the cracks C1 are closed at the surface by the pressing and thus the cracks C2 shown in FIG. 1C are formed. The quantity of the formed cracks C2 can also be controlled (increased and decreased) in accordance with the pressure applied by the pressing. Here, it is also possible to perform cutting of the positive plate 10 into a predetermined shape (plate length, plate thickness, plate width, etc.) with a processing machine together with the pressing. The positive plate 10, which can be wound, is formed in this way.

Second Process (Process of Forming Negative Plate 20)

At S20, mixing is performed. Namely, a mixed material for the negative layers 21 and 23 is formed. The mixed material is a substance produced by mixing a binder 20a, a negative active material 20b, an electrically conductive material 20c, a solvent 20d, and the like.

Any binder can be used as the binder 20a in the same way as the binder 10a. Examples are polyvinylidene fluoride (PVDF) and a denatured body thereof. Here, in order to improve lithium ion acceptability, it is possible to use or add cellulosic resin including carboxymethyl cellulose (CMC) and the like in combination with or in small quantity to styrene butadiene copolymer rubber (SBR) particles and a denatured body thereof.

The negative active material 20b is made of a light metal, an alloy containing the light metal, or a material capable of occluding and disengaging the alloy or the light metal itself. Examples of the light metal are lithium (Li) and sodium (Na). Examples of the material capable of occluding and disengaging a light metal are a carbon material, silicon (Si), a silicide, metallic oxide, and a high molecular compound. Examples of the carbon material are pyrolytic carbon, coke, graphite, glassy carbon, a baked high polymeric organic substance, carbon fiber, and activated carbon. The coke includes pitch coke, needle coke, and petroleum coke for example. The glassy carbon includes a non-graphitizable carbon material. The baked high polymeric organic substance is a substance obtained by baking and carbonating a high polymer (phenolic resin or furan resin for example) at a high temperature (about 500 degrees Celsius (° C.) or higher for example) in inert gas flow or in vacuum. Examples of the silicide are $CaSi_2$ and $CoSi_2$. An example of the metallic oxide is tin oxide ($SnO_2$). Examples of the high polymer are polyacetylene and polypyrrole. The material used as the negative active material 20b can arbitrarily be selected in accordance with the type, application, and the like of a battery.

As the electrically conductive material 20c, any material can be used as long as it is an electrically conductive material (including an electrically conductive composite material). The electrically conductive material 20c may be an electrically conductive material either identical to or different from the electrically conductive material 10c. As the solvent 20d, a substance suitable for mixing is used in the same way as the solvent 10d. The solvent 20d may be a solvent either identical to or different from the solvent 10d.

The insulative separator 30 is made of a porous high polymer material or solid electrolyte. The thickness of the separator 30 is in the range of 10 to 50 µm for example. Examples of the high polymer material are polypropylene, polyethylene, and polymethylpentene. Further, nonwoven fabric formed from such a high polymer material or a stretched porous film may also be used. As the solid electrolyte, zirconia is used for example.

At S22, the coating is performed. Namely, the mixed material produced at S20 is applied on the surfaces of the negative collector 22 to form the negative layers 21 and 23 in the same way as the S12. Specifically, the negative layers 21 and 23 are formed on the surfaces of the negative collector 22 by applying the mixed material by a forming method similar to the S12. The thicknesses of the negative layers 21 and 23 are adjusted so as to be 10 to 200 µm per one side for example. The thickness of the negative collector 22 is about 5 to 50 µm for example. The band-shaped negative plate 20 is formed in this way.

Successively, at S24, the drying is performed. Namely, the negative plate 20 is dried to generate the cracks C1 in the same way as the S14. At S26, the pressing is performed. Namely, the negative plate 20 is pressed with a press machine in the same way as the S16. The negative plate 20, which can be wound, is formed in this way.

Third Process (Winding and Flattening-Pressing)

At S30, the winding is performed. Namely, the positive plate 10 formed through the first process, the negative plate 20 formed through the second process, the separator 30, and the like are stacked and wound into a coil shape to form a wound body 100. At S32, the flattening-pressing is performed. Namely; the wound body 100 produced at the S30 is pressed into a flat shape. By pressing the wound body 100 into the flat shape, the flat body 200 as the electrode body is produced, as shown in FIG. 9.

For example, at S30, the positive plate 10, the negative plate 20, the separator 30, and the like are stacked and wound around a winding unit 50 as shown in FIG. 7. An example of the winding unit 50 is a columnar or cylindrical roller and the winding unit 50 rotates in a predetermined direction (the direction indicated with the arrow D6 for example) and winds them.

At S32, as shown in FIG. 8, the wound body 100 is fixed onto the planer table 54 (planer work table) and is pressed by moving a flattening-pressing unit 52 in a press direction (the direction indicated with the arrow D7 for example). An example of the flattening-pressing unit 52 is a press machine having a press face 52a of a predetermined shape (planar shape for example).

The flat body 200 shown in FIG. 9 is produced through the first to third processes. A site where the cracks C1 and C2 are formed may be either the whole or a part of the flat body 200. When the cracks C1 and C2 are formed at a part of the flat body 200, the cracks C1 and C2 are formed in a crack forming site A1 shown by the oblique hatch in FIG. 9. The crack forming site A1 is the center part (site up to a predetermined number of turns) of the flat body 200 and corresponds to a site where a non-aqueous electrolyte and an electrolytic solution hardly intrude if the cracks are not formed. The predetermined number of turns is about 20% of a total number of turns, on the inner circumference side for example. It is possible to improve the performance of the wound type battery by forming the cracks C1 and C2 at least at the site A1.

According to the above described first embodiment, the following advantageous effects are provided.

As shown in FIGS. 1B, 1C and 2A, in a battery where at least one of the positive plate 10 and the negative plate 20 has the cracks C1 and C2 generated by the drying in the whole area of the electrode layer, because the cracks C1 and C2 generated by the drying do not affect the collector, such as the positive collector 12 and the negative collector 22. Therefore, it is possible to secure the strength, durability, etc. of the collectors.

As shown in FIGS. 1B, 1C and 2B, in a battery where at least one of the positive plate 10 and the negative plate 20 has the cracks C1 and C2 at a part of the electrode layer, the part corresponding to a region apart from the collector exposed part 12a, 22a (connection coupled to an electrode) at least by the predetermined distance (a crack non-forming width B3), the cracks C1 and C2 generated by the drying exist in the region apart from the connection by a predetermined distance or more. Since cracks C1 and C2 formed by the drying do not affect the collectors, it is possible to secure the strength, durability, etc. of the collectors.

As shown in FIG. 6, in a battery where the cracks C1 and C2 are formed in the electrode layer (e.g., the positive layers 11, 13, the negative layers 21, 23) of at least one of the positive plate 10 and the negative plate 20 by drying the electrode layer at a predetermined drying rate (the control line L2 in FIG. 6), the electrode layer do not largely tear. Since the cracks C1 and C2 generated by the drying do not affect the collectors, it is possible to secure the strength, durability, etc. of the collectors.

As shown in FIG. 2C, the cracks C1 and C2 include internal clacks C2 that exist in the inside of the electrode layer. In this case, in addition to the cracks C1 appearing on the surface of the electrode layer, the cracks C2 exist in the inside of the electrode layer. Since the cracks are formed not only at the surface of the electrode layer but also in the inside of the electrode layer, liquid depletion and ion depletion can be inhibited to the extent of the increase of the cracks C1 and C2.

For example, the cracks C1 and C2 are formed so that the maximum width of the cracks C1 and C2 are 2 to 10 times the average particle diameter of the active material. In this case, since the maximum width of the cracks C1 and C2 is 2 to 10 times the average particle diameter of the active material, it is possible to further inhibit the liquid depletion and the ion depletion.

For example, the cracks C1 and C2 are formed so that the total length of the cracks C1 and C2 in the planar direction is 0.1 to 1.0 cm/cm$^2$ in the planar direction of the electrode plate. In this case, since the total length of the cracks in the planar direction is 0.1 to 1.0 cm/cm$^2$, it is possible to further inhibit the liquid depletion and the ion depletion.

For example, the electrode layers are configured to contain the fibrous conductive material 10c, 20c. In this case, the fibrous conductive material 10c, 20c makes it possible to electrically couple the electrode layers where the cracks C1 and C2 are generated to each other and also compensate the strength reduction caused by the cracks C1 and C2. Consequently, it is possible to inhibit the deterioration of electric conductivity between the electrode layers to a low level.

For example, the cracks C1 and C2 are formed at a site up to a predetermined number of turns in the wound body 100 (wound electrode body), as shown in FIG. 9. In this case, the cracks C1 and C2 are formed positively at the center part of the electrode body where an electrolytic solution hardly penetrates. Since the electrolytic solution is likely to penetrate into the cracks C1 and C2, it is possible to improve battery performance in comparison with the case where the cracks C1 and C2 are not formed. Here, the "predetermined number of turns" is about 20% of the total number of turns. However, the predetermined number of turns varies in accordance with the thickness of the collector and the electrode layers.

In the manufacturing method of the battery, the drying (crack forming) is performed to form the cracks C1 and C2. For example, the drying is performed by drying the electrode layer applied on the collector at a predetermined drying rate, as shown in FIG. 3. In this case, since the cracks C1 and C2 generated by the drying do not affect the collectors, it is possible to secure the strength, durability, etc. of the collectors.

For example, the drying is performed by heating the center part of the electrode plate in the width direction to dry the electrode layer, as shown in FIG. 1C. In this case, since an electrolytic solution is likely to penetrate into the formed cracks C1 and C2, it is possible to improve battery performance in comparison with the case where the cracks C1 and C2 are not formed.

An apparatus for manufacturing a battery has a drying unit 40 as the crack forming unit. The drying unit 40 forms the cracks C1 and C2 by drying the electrode layer disposed on the collector at a predetermined drying rate, as shown in FIGS. 2C and 6. In this case, since the cracks C1 and C2 generated by the drying do not affect the collectors, it is possible to secure the strength, durability, etc. of the collectors.

Second Embodiment

A second embodiment is an example of a stacked type battery and is explained in reference to FIGS. 10A to 12. In order to simplify explanations here, points of the second embodiment that are different from those of the first embodiment are mainly explained. Consequently, a component identical to or similar to the component of the first embodiment is represented with an identical code and the explanation there of is not repeated.

A substantial difference between the stacked type battery according to the second embodiment and the wound type battery according to the first embodiment is the shape of electrode plates. That is, the difference is that, whereas the shape of electrode plates is the band shape in the case of the wound type battery, the shape of electrode plates is a rectangular shape (including a square shape) in the case of the stacked type battery. A site where the cracks C1 and C2 are formed is explained in reference to FIGS. 10A and 10B.

Figure 10A:
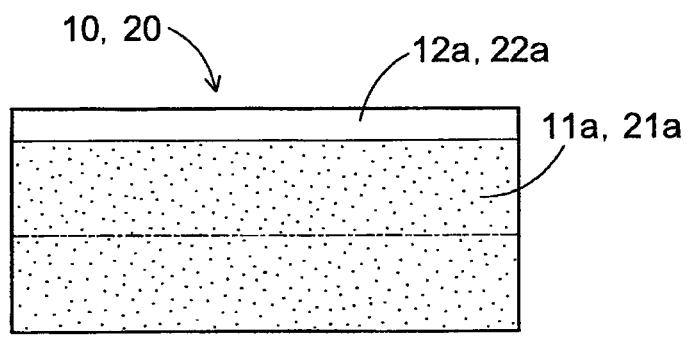
FIGS. 10A and 10B are plan views of an electrode plate of a battery for illustrating examples of a crack forming part according to a second embodiment.
Figure 10B:
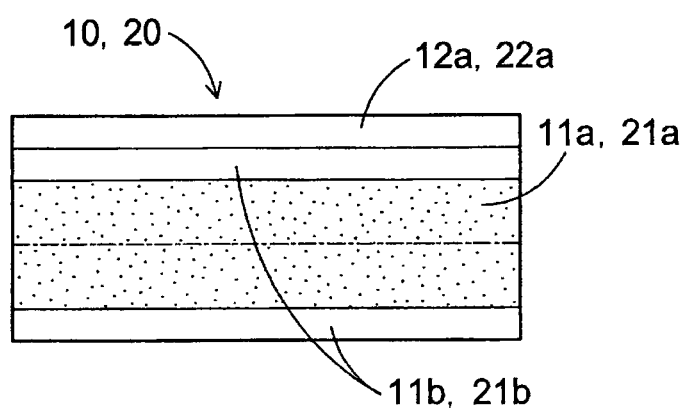

A site where the cracks C1 and C2 are formed in a rectangular electrode plate, such as the positive plate 10 and the negative plate 20, is shaded (dotted) in FIGS. 10A and 10B in order to make it understandable. The example of the cracks C1 and C2 shown in FIG. 10A corresponds to the example shown in FIG. 2A of the first embodiment. Likewise, the example of the cracks C1 and C2 shown in FIG. 10B corresponds to the example shown in FIG. 2B of the first embodiment. A method of forming the cracks C1 and C2 is similar to the method shown in FIG. 2C of the first embodiment.

Figure 11:
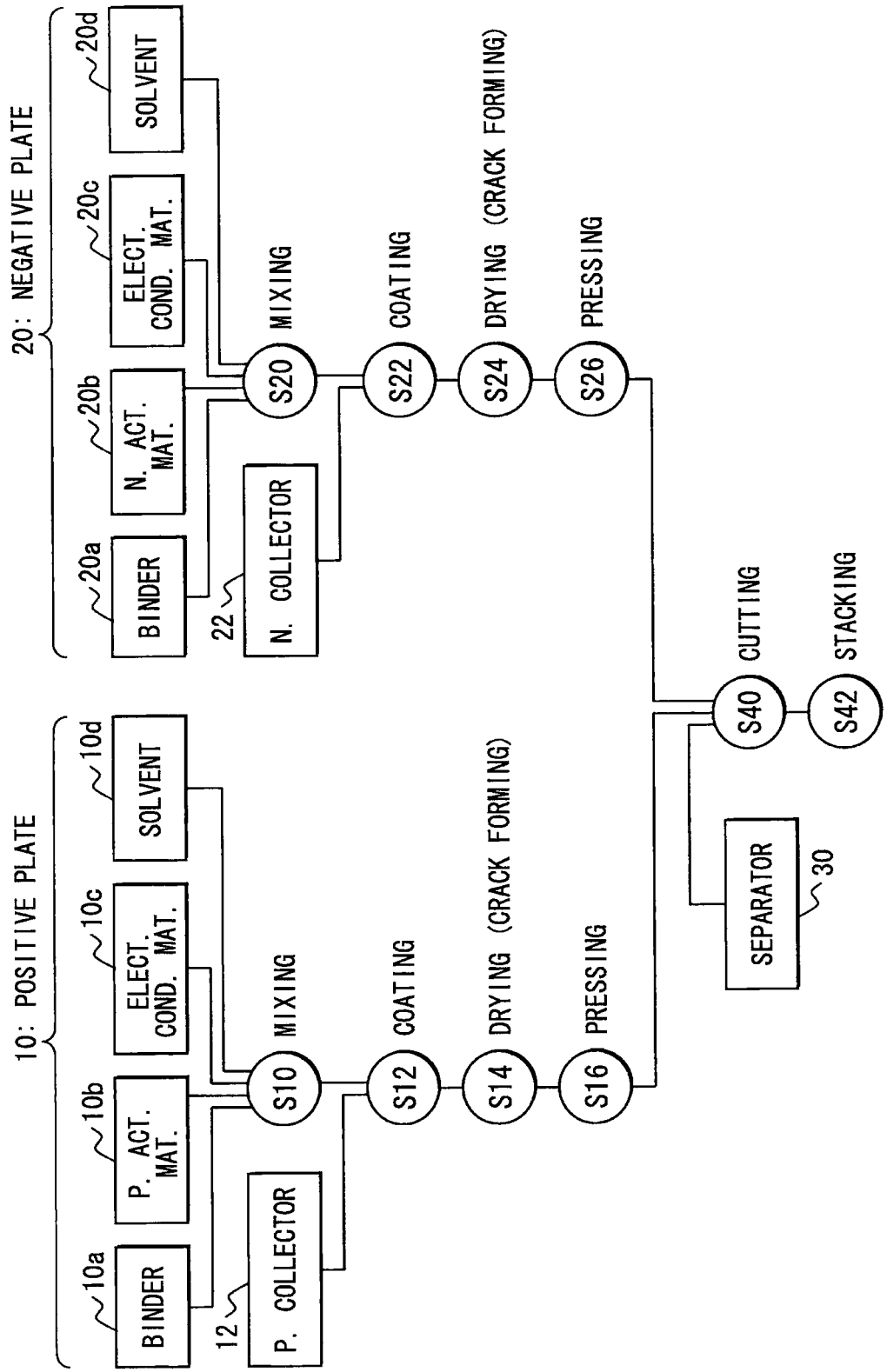
FIG. 11 is a flowchart illustrating a manufacturing method of a stacked type battery according to the second embodiment.

FIG. 11 is a chart showing processes of manufacturing the stacked type battery by stacking the positive plate 10, the negative plate 20, the separator 30, and the like. The manufacturing method shown in FIG. 11 is similar to the manufacturing method shown in FIG. 3 and hence different processes are mainly explained hereinafter. In the manufacturing process shown in FIG. 11, a third process including cutting of S40 and stacking of S42 is different from the third process of the manufacturing method shown in FIG. 3.

At S40, the cutting is performed. Namely, a band-shaped positive plate 10, a band-shaped negative plate 20, and a band-shaped separator 30 are cut into a rectangular shape respectively. That is, the band-shaped positive plate 10, the band-shaped negative plate 20 and the band-shaped separator 30 are cut into such a shape shown in FIGS. 10A and 10B with a cutting machine.

At S43, the stacking is performed. Namely, the positive plate 10, the negative plate 20, the separator 30, and the like cut through the cutting process of the S40 are stacked. After the stacking, as shown in FIG. 12, a stacked body 300 as an electrode body is formed.

Figure 12:
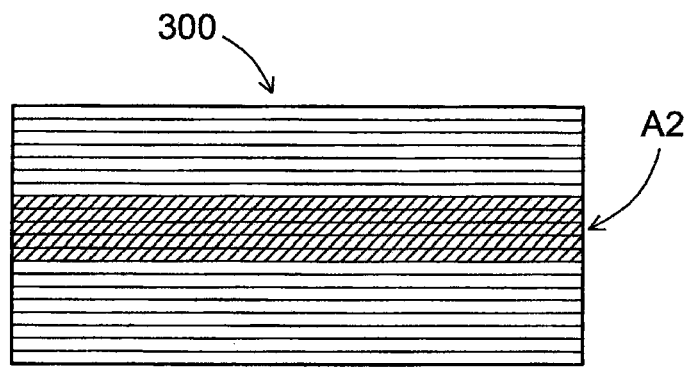
FIG. 12 is a schematic side view of an electrode body of the stacked type battery for illustrating a crack forming site according to the second embodiment.

The stacked body 300 shown in FIG. 12 is formed through the first to third processes. A site where the cracks C1 and C2 are formed corresponds to either the whole or a part of the stacked body 300. When the cracks C1 and C2 are formed at a part of the stacked body 300, it is desirable that the cracks C1 and C2 are formed in a crack forming site A2 shown with the oblique hatch in FIG. 12. The crack forming site A2 is the center part (site up to a predetermined number of layers from a center layer) of the stacked body 300 and corresponds to a site where a non-aqueous electrolyte and an electrolytic solution hardly intrude when the cracks are not formed. The predetermined number of layers is about 20% of the total number of layers in the center for example. It is possible to improve the performance of the stacked type battery by forming the cracks C1 and C2 at the site A2.

In the second embodiment, the cracks C1 and C2 are formed at the site A2 up to the predetermined number of layers from the center layer in the stacked body 300 (stacked electrode body), as shown in FIG. 12. By the configuration, the cracks C1 and C2 are formed positively at the center part of the electrode body where the electrolytic solution hardly penetrates. Since the electrolytic solution is likely to penetrate into the formed cracks C1 and C2, it is possible to improve battery performance in comparison with the case where cracks C1 and C2 are not formed. Further, the advantageous effects similar to the first embodiment can be also provided.

Other Embodiments

The exemplary embodiments according to the present disclosure are described hereinabove, but the present disclosure is not limited to the above described exemplary embodiments. The present disclosure may be implemented in various other ways without departing from the gist of the present disclosure. The following configurations may be adoptable for example.

In the first and second embodiments described above, the positive layers 11 and 13 is formed on the positive collector 12 with the mixed material produced by mixing the binder 10a, the positive active material 10b, the electrically conductive material 10c, and the solvent 10d (e.g., the coating at the S12 and S22 in FIGS. 3 and 11). Alternatively, it is possible to form the positive layers 11 and 13 directly on the positive collector 12 by applying the binder 10a, the positive active material 10b, the electrically conductive material 10c, and the solvent 10d in parallel or in predetermined order on the positive collector 12. The same goes for the case where the negative layers 21 and 23 are formed on the negative collector 22. In such a case, the mixing is unnecessary and hence it is possible to save time required for forming the electrode plate.

In the first and second embodiments described above, the electrode layers are formed on both the surfaces of the collector. That is, the positive layers 11 and 13 are formed on both the surfaces of the positive collector 12, and the negative layers 21 and 23 are formed on both the surfaces of the negative collector 22. Alternatively, it is possible to form the electrode layer over only one surface of the collector. Also in such a case, the advantageous effects similar to those of the above described embodiments will be provided.

Figure 13A:
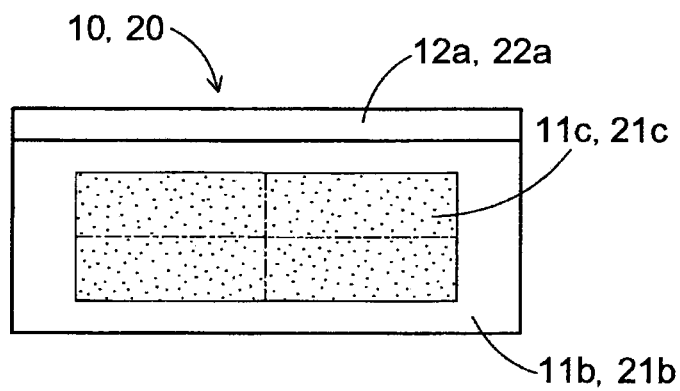
FIGS. 13A and 13B are plan views of an electrode plate of a battery for illustrating examples of a crack forming part according to modifications.

In the second embodiment, the cracks C1 and C2 are formed in the whole area of the positive layer 11 of the rectangular positive plate 20 as shown in FIG. 10A or in the part (almost the whole area) of the positive layer 11 of the rectangular positive plate 10 as shown in FIG. 10B. Alternatively, it is possible to form the cracks C1 and C2 in a center part of the positive layer 11 of the rectangular positive plate 10. As shown in FIG. 13A for example, the cracks C1 and C2 are formed in a region apart from the end of the rectangular positive plate 10, including the collector exposed part 12a (connection coupled to an electrode), by a predetermined distance or more, namely in a crack forming part 11c shown in the figure. In the stacked body 300 shown in FIG. 12, the stacked layers, such as the positive plate 10, the negative plate 20, the separator 30 and the like, adhere tightly to each other and hence the quantity of a non-aqueous electrolyte, an electrolytic solution, or the like, which can penetrate into, reduces toward the center side. Accordingly, it is possible to improve the performance of the stacked type battery by forming the cracks C1 and C2 in the crack forming part 11c on the center side and facilitating the intrusion of the non-aqueous electrolyte, the electrolytic solution, or the like. Although explanations have been made on the basis of the positive layer 11 of the positive plate 10, the same goes for the positive layer 13 and the negative layers 21 and 23 of the negative plate 20.

Figure 13B:
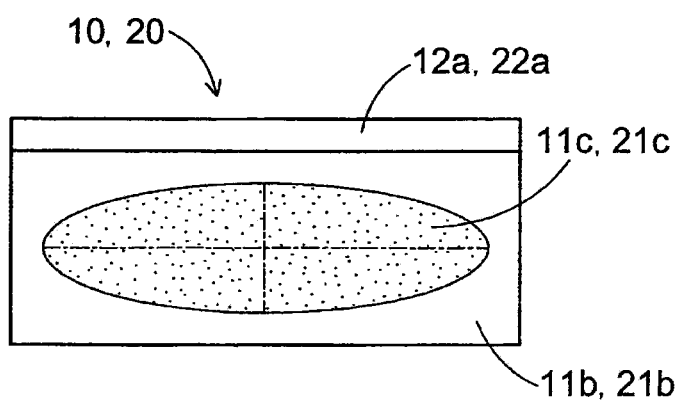

In the first and second embodiments, the cracks C1 and C2 are formed to have one of or both of the first and second characteristics nearly evenly in a desired region of the electrode plate, as shown in FIGS. 1A to 1C, 2A to 2C, 10A and 10B, and other figures. Alternatively, it is possible to increase the proportion of the cracks C1 and C2 toward the center. For example, in the case of the flat body 200 of FIG. 9, the center of the electrode body corresponds to the innermost circumferential. In the case of the stacked body 300 of FIG. 12, the center of the electrode body corresponds to the center of the stacked layers. Further, the center of the electrode plate corresponds to a location indicated with a dashed-dotted line (a transverse line) in the crack forming part 11a in the example shown in FIGS. 10A and 10B. Also, the center of the electrode plate corresponds to a location indicated with dashed-dotted lines (a vertical line and a transverse line) in the crack forming part 11c in the example shown in FIGS. 13A and 13B. By increasing the proportion of cracks C1 and C2 toward the center, it is possible to facilitate the intrusion of a non-aqueous electrolyte, an electrolytic solution, or the like and improve the performance of the battery, such as the wound type battery, the stacked type battery, and another type battery.

Summarizing the above embodiments, in one embodiment, a battery includes a positive plate 10, a negative plate 20 and an insulative separator 30 disposed between the positive plate 10 and the negative plate 20. Each of the positive plate 10 and the negative plate 20 includes a collector 12, 22 and an electrode layer 11, 13, 21, 23 disposed on at least one surface of the collector 12, 22. The electrode layer 11, 13, 21, 23 containing an active material. At least one of the positive plate 10 and the negative plate 20 has cracks C1, C2 in a whole area of the electrode layer 11, 13, 21, 23 thereof.

In such a structure, the cracks C1, C2 generated by drying do not affect the collector 12, 22, it is possible to secure strength and durability of the collector 12, 22.

In one embodiment, a battery includes a positive plate 10, a negative plate 20 and an insulative separator 30 disposed between the positive plate 10 and the negative plate 20. Each of the positive plate 10 and the negative plate 20 includes a collector 12, 22 and an electrode layer 11, 13, 21, 23 disposed on at least one surface of the collector 12, 22. The electrode layer 11, 13, 21, 23 containing an active material. At least one of the positive plate 10 and the negative plate 20 has cracks C1, C2 at a part of the electrode layer 11, 13, 21, 23 thereof, the part being away from a connector of the corresponding one of the positive plate 10 and the negative plate 20 to be coupled to an electrode at least by a predetermined distance.

Also in such a structure, the cracks C1, C2 generated by drying do not affect the collector 12, 22, it is possible to secure strength and durability of the collector 12, 22.

Here, the collector 12, 22 contains an electrically conductive material (including a substance). For example, the collector is formed into a band shape (a long sheet) but the thickness thereof is arbitrary. The separator 30 is a member to prevent the positive plate 10 and the negative plate 20 from being brought into contact with each other and includes an insulative plate material, a solid electrolyte, etc. for example. The electrode layer 11, 13, 21, 23 is also referred to as a mixture layer and the material thereof is different between the positive layer 10 and the negative layer 20. The electrode layer 11, 13 of the positive plate 10 contains a material such as a metallic sulfide, a metallic oxide, or a high molecular compound that can occlude and disengage light metal ions such as lithium ions. The electrode layer 21, 23 of the negative plate 20 includes a light metal such as lithium (Li) or sodium (Na), an alloy containing such a light metal, or a material that can occlude and disengage a light metal, or the like. The thickness of the electrode layer 11, 13, 21, 23 is 10 to 200 μm per side for example. The whole area of the electrode layer includes an almost whole area. The "almost whole area" means the site of the electrode plate from which a region in a predetermined range from the periphery (a range between more than 0% and not more than 10% for example) is excluded. The cracks C1, C2 are contained on the surface (including the surface layer) of the electrode layer and in the interior of the electrode layer.

In one embodiment of a method of manufacturing the battery, the electrode layer 11, 13, 21, 23 is deposited on a surface of the collector 12, 22 of at least one of the positive plate 10 and the negative plate 20, and the electrode layer 11, 13, 21, 23 is dried at a predetermined drying rate to form cracks C1, C2 in the electrode layer 11, 13, 21, 23. The insulative separator 30 is interposed between the positive plate 10 and the negative plate 20. In such a method, the cracks C1, C2 are positively formed by the drying. The cracks C1, C2 generated by the drying do not affect the collector 12, 22 and hence the strength and durability of the collector 12, 22 can be secured.

The battery is formed by a manufacturing apparatus including a crack forming unit 40. The crack forming unit 40 dries the electrode layer 11, 13, 21, 23 at a predetermined drying rate to form the cracks C1, C2 in the electrode layer 11, 13, 21, 23. By such an apparatus, the cracks C1, C2 are positively formed by the crack forming unit 40. The cracks C1, C2 generated by the drying do not affect the collector 12, 22 and hence the strength and durability of the collector 12, 22 can be secured.

EXAMPLES

Examples corresponding to the first and second embodiments are explained in reference to Tables 1 to 3 shown below. Data on positive plates 10 are shown in Table 1. Data on negative plates 20 are shown in Table 2. Performance test results of batteries having the positive plates 10 and the negative plates 20 are shown in Table 3. In Tables 1 to 3, the planar direction total crack length is referred merely to a "crack length." Examples 1 to 6 correspond to both the first and second embodiments. Comparative Examples 1 to 3 related to Examples 1 to 6 are also shown. Here, polyvinylidene fluoride (PVDF) is commonly used for the binders 10a and 20a and N-methyl-2-pyrrolidone (NMP) is commonly used for the solvents 10d and 20d. The present disclosure is not limited to the examples and can be variously modified. Even in the cases of various modifications, the similar advantageous effects as described above in connection with the first and second embodiments will be provided.

Example 1

With regard to the positive plate 10, lithium iron phosphate ($LiFePO_4$) as the positive active material 10b, acetylene black (AB) and vapor grown carbon fiber (VGCF) as the electrically conductive material 10c, and others are blended and the positive layers 11 and 13 are formed over the surfaces of the positive collector 12 so that the thicknesses D1 and D2 are 100 μm. The positive layers 11 and 13 are dried in accordance with the control line L2 shown in FIG. 6 by setting the initial drying rate dw/dt at 0.2 $min^{-1}$ and resultantly the planar direction total crack length of the formed cracks C1 and C2 is 0.6 $cm/cm^2$.

With regard to the negative plate 20, without using the electrically conductive material 20c, carbon (C) as the negative active material 20b and others are blended, and the negative layers 21 and 23 are formed over the surfaces of the negative collector 22 so that the thicknesses D1 and D2 are 100 μm. The negative layers 21 and 23 are dried in accordance with the control line L2 shown in FIG. 6 by setting the initial drying rate dw/dt at 0.6 $min^{-1}$ and resultantly the planar direction total crack length of the formed cracks C1 and C2 is 0.2 $cm/cm^2$.

A battery is formed using the positive plate 10 and the negative plate 20 described above and performance test is carried out, and resultantly the design capacitance ratio at constant discharge of 3 hour rate (3C) is 98% and the capacitance retention rate after one month storage at a temperature of 60° C. is 97%.

Example 2

With regard to the positive plate 10, lithium iron phosphate ($LiFePO_4$) as the positive active material 10b, acetylene black (AB) and vapor grown carbon fiber (VGCF) as the electrically conductive material 10c, and others are blended and the positive layers 11 and 13 are formed over the surfaces of the positive collector 12 so that the thicknesses D1 and D2 are 120 p.m. The positive layers 11 and 13 are dried in accordance with the control line L2 shown in FIG. 6 by setting the initial drying rate dw/dt at 0.1 $min^{-1}$ and resultantly the cracks C1 and C2 are not formed.

With regard to the negative plate 20, carbon (C) as the negative active material 20b, vapor grown carbon fiber (VGCF) as the electrically conductive material 20c, and others are blended and the negative layers 21 and 23 are formed over the surfaces of the negative collector 22 so that the thicknesses D1 and D2 are 90 μm. The negative layers 21 and 23 are dried in accordance with the control line L2 shown in FIG. 6 by setting the initial drying rate dw/dt at 0.6 $min^{-1}$ and resultantly the planar direction total crack length of the formed cracks C1 and C2 is 0.4 $cm/cm^2$.

A battery is formed using the positive plate 10 and the negative plate 20 described above and performance test is carried out, and resultantly the design capacitance ratio at constant discharge of 3 hour rate (3C) is 92% and the capacitance retention rate after one month storage at a temperature of 60° C. is 85%.

Example 3

With regard to the positive plate 10, lithium iron phosphate (LiFePO$_4$) as the positive active material 10b, acetylene black (AB) as the electrically conductive material 10c, and others are blended and the positive layers 11 and 13 are formed over the surfaces of the positive collector 12 so that the thicknesses D1 and D2 are 100 μm. The positive layers 11 and 13 are dried in accordance with the control line L2 shown in FIG. 6 by setting the initial drying rate dw/dt at 0.2 min$^{-1}$ and resultantly the planar direction total crack length of the formed cracks C1 and C2 is 1.0 cm/cm$^2$.

With regard to the negative plate 20, without using the electrically conductive material 20c, carbon (C) and copper sulfide (CuS) as the negative active material 20b, and others are blended, and the negative layers 21 and 23 are formed over the surfaces of the negative collector 22 so that the thicknesses D1 and D2 are 60 μm. The negative layers 21 and 23 are dried in accordance with the control line L2 shown in FIG. 6 by setting the initial drying rate dw/dt at 0.4 min$^{-1}$ and resultantly the cracks C1 and C2 are not formed.

A battery is formed using the positive plate 10 and the negative plate 20 described above and performance test is carried out, and resultantly the design capacitance ratio at constant discharge of 3 hour rate (3C) is 96% and the capacitance retention rate after one month storage at a temperature of 60° C. is 80%.

Example 4

With regard to the positive plate 10, lithium nickel oxide (LiNiO$_2$) as the positive active material 10b, acetylene black (AB) as the electrically conductive material 10c, and others are blended and the positive layers 11 and 13 are formed over the surfaces of the positive collector 12 so that the thicknesses D1 and D2 are 80 μm. The positive layers 11 and 13 are dried in accordance with the control line L2 shown in FIG. 6 by setting the initial drying rate dw/dt at 0.3 min$^{-1}$ and resultantly the planar direction total crack length of the formed cracks C1 and C2 is 0.2 cm/cm$^2$.

With regard to the negative plate 20, without using electrically conductive material 20c, carbon (C) as the negative active material 20b and others are blended, and the negative layers 21 and 23 are formed over the surfaces of the negative collector 22 so that the thicknesses D1 and D2 are 50 μm. The negative layers 21 and 23 are dried in accordance with the control line L2 shown in FIG. 6 by setting the initial drying rate dw/dt at 0.7 min$^{-1}$ and resultantly the planar direction total crack length of the formed cracks C1 and C2 is 0.7 cm/cm$^2$.

A battery is formed using the positive plate 10 and the negative plate 20 described above and performance test is carried out, and resultantly the design capacitance ratio at constant discharge of 3 hour rate (3C) is 95% and the capacitance retention rate after one month storage at a temperature of 60° C. is 88%.

Example 5

With regard to the positive plate 10, lithium nickel oxide (LiNiO$_2$) as the positive active material 10b, acetylene black (AB) as the electrically conductive material 10c, and others are blended and the positive layers 11 and 13 are formed over the surfaces of the positive collector 12 so that the thicknesses D1 and D2 are 100 μm. The positive layers 11 and 13 are dried in accordance with the control line L2 shown in FIG. 6 by setting the initial drying rate dw/dt at 0.3 min$^{-1}$ and resultantly the planar direction total crack length of the formed cracks C1 and C2 is 0.6 cm/cm$^2$.

With regard to the negative plate 20, without using the electrically conductive material 20c, carbon (C) as the negative active material 20b and others are blended, and the negative layers 21 and 23 are formed over the surfaces of the negative collector 22 so that the thicknesses D1 and D2 are 60 μm. The negative layers 21 and 23 are dried in accordance with the control line L2 shown in FIG. 6 by setting the initial drying rate dw/dt at 0.3 min$^{-1}$ and resultantly the cracks C1 and C2 are not formed.

A battery is formed using the positive plate 10 and the negative plate 20 described above and performance test is carried out, and resultantly the design capacitance ratio at constant discharge of 3 hour rate (3C) is 91% and the capacitance retention rate after one month storage at a temperature of 60° C. is 82%.

Example 6

With regard to the positive plate 10, lithium nickel cobalt manganate (LiNiCoMnO$_2$) as the positive active material 10b, acetylene black (AB) as the electrically conductive material 10c, and others are blended and the positive layers 11 and 13 are formed over the surfaces of the positive collector 12 so that the thicknesses D1 and D2 are 80 p.m. The positive layers 11 and 13 are dried in accordance with the control line L2 shown in FIG. 6 by setting the initial drying rate dw/dt at 0.3 min$^{-1}$ and resultantly the planar direction total crack length of the formed cracks C1 and C2 is 0.3 cm/cm$^2$.

With regard to the negative plate 20, without using the electrically conductive material 20c, carbon (C) as the negative active material 20b and others are blended, and negative layers 21 and 23 are formed over the surfaces of the negative collector 22 so that the thicknesses D1 and D2 are 50 μm. The negative layers 21 and 23 are dried in accordance with the control line L2 shown in FIG. 6 by setting the initial drying rate dw/dt at 0.8 min$^{-1}$ and resultantly the planar direction total crack length of the formed cracks C1 and C2 is 0.2 cm/cm$^2$.

A battery is formed using the positive plate 10 and the negative plate 20 described above and performance test is carried out, and resultantly the design capacitance ratio at constant discharge of 3 hour rate (3C) is 94% and the capacitance retention rate after one month storage at a temperature of 60° C. is 88%.

Comparative Example 1

With regard to the positive plate 10, lithium iron phosphate (LiFePO$_4$) as the positive active material 10b, acetylene black (AB) and vapor grown carbon fiber (VGCF) as the electrically conductive material 10c, and others are blended and the positive layers 11 and 13 are formed over the surfaces of the positive collector 12 so that the thicknesses D1 and D2 are 100 μm. The positive layers 11 and 13 are dried in accordance with the control line L2 shown in FIG. 6 by setting the initial drying rate dw/dt at 0.1 min$^{-1}$ and resultantly the cracks C1 and C2 are not formed.

With regard to the negative plate 20, without using the electrically conductive material 20c, carbon (C) as the negative active material 20b and others are blended, and the negative layers 21 and 23 are formed over the surfaces of the negative collector 22 so that the thicknesses D1 and D2 are 80 μm. The negative layers 21 and 23 are dried in accordance with the control line L2 shown in FIG. 6 by setting the initial drying rate dw/dt at 0.3 min$^{-1}$ and resultantly the cracks C1 and C2 are not formed.

A battery is formed using the positive plate 10 and the negative plate 20 described above and performance test is carried out, and resultantly the design capacitance ratio at constant discharge of 3 hour rate (3C) is 86% and the capacitance retention rate after one month storage at a temperature of 60° C. is 72%.

Comparative Example 2

With regard to the positive plate 10, lithium nickel oxide (LiNiO$_2$) as the positive active material 10b, acetylene black (AB) as the electrically conductive material 10c, and others are blended and the positive layers 11 and 13 are formed over the surfaces of the positive collector 12 so that the thicknesses D1 and D2 are 80 μm. The positive layers 11 and 13 are dried in accordance with the control line L2 shown in FIG. 6 by setting the initial drying rate dw/dt at 0.2 min$^{-1}$ and resultantly the cracks C1 and C2 are not formed.

With regard to the negative plate 20, without using the electrically conductive material 20c, carbon (C) as the negative active material 20b and others are blended, and the negative layers 21 and 23 are formed over the surfaces of the negative collector 22 so that the thicknesses D1 and D2 are 50 μm. The negative layers 21 and 23 are dried in accordance with the control line L2 shown in FIG. 6 by setting the initial drying rate dw/dt at 0.4 min$^{-1}$ and resultantly the cracks C1 and C2 are not formed.

A battery is formed using the positive plate 10 and the negative plate 20 described above and performance test is carried out, and resultantly the design capacitance ratio at constant discharge of 3 hour rate (3C) is 88% and the capacitance retention rate after one month storage at a temperature of 60° C. is 76%.

Comparative Example 3

With regard to the positive plate 10, lithium nickel cobalt manganate (LiNiCoMnO$_2$) as the positive active material 10b, acetylene black (AB) as the electrically conductive material 10c, and others are blended and the positive layers 11 and 13 are formed over the surfaces of the positive collector 12 so that the thicknesses D1 and D2 are 80 μm. The positive layers 11 and 13 are dried in accordance with the control line L2 shown in FIG. 6 by setting the initial drying rate dw/dt at 0.2 min$^{-1}$ and resultantly the cracks C1 and C2 are not formed.

With regard to the negative plate 20, without using the electrically conductive material 20c, carbon (C) as the negative active material 20b and others are blended, and the negative layers 21 and 23 are formed over the surfaces of the negative collector 22 so that the thicknesses D1 and D2 are 50 μm. The negative layers 21 and 23 are dried in accordance with the control line L2 shown in FIG. 6 by setting the initial drying rate dw/dt at 0.4 min$^{-1}$ and resultantly the cracks C1 and C2 are not formed.

A battery is formed using the positive plate 10 and the negative plate 20 described above and performance test is carried out, and resultantly the design capacitance ratio at constant discharge of 3 hour rate (3C) is 87% and the capacitance retention rate after one month storage at a temperature of 60° C. is 78%.

TABLE 1

| | Positive active material | Electrically conductive material | Thickness [μm] | Crack length [cm/cm$^2$] | Drying rate [min$^{-1}$] |
|---|---|---|---|---|---|
| Example 1 | LiFePO$_4$ | AB + VGCF | 100 | 0.6 | 0.2 |
| Example 2 | LiFePO$_4$ | AB + VGCF | 120 | Not formed | 0.1 |
| Example 3 | LiFePO$_4$ | AB | 100 | 1.0 | 0.2 |
| Example 4 | LiNiO$_2$ | AB | 80 | 0.2 | 0.3 |
| Example 5 | LiNiO$_2$ | AB | 100 | 0.6 | 0.3 |
| Example 6 | LiNiCoMnO$_2$ | AB | 80 | 0.3 | 0.3 |
| Comparative Example 1 | LiFePO$_4$ | AB + VGCF | 100 | Not formed | 0.1 |
| Comparative Example 2 | LiNiO$_2$ | AB | 80 | Not formed | 0.2 |
| Comparative Example 3 | LiNiCoMnO$_2$ | AB | 80 | Not formed | 0.2 |

TABLE 2

| | Negative active material | Electrically conductive material | Thickness [μm] | Crack length [cm/cm$^2$] | Drying rate [min$^{-1}$] |
|---|---|---|---|---|---|
| Example 1 | C | Not used | 80 | 0.2 | 0.6 |
| Example 2 | C | VGCF | 90 | 0.4 | 0.6 |
| Example 3 | C + CuS | Not used | 60 | Not formed | 0.4 |
| Example 4 | C | Not used | 50 | 0.1 | 0.7 |
| Example 5 | C | Not used | 60 | Not formed | 0.3 |
| Example 6 | C | Not used | 50 | 0.2 | 0.8 |
| Comparative Example 1 | C | Not used | 80 | Not formed | 0.3 |
| Comparative Example 2 | C | Not used | 50 | Not formed | 0.4 |
| Comparative Example 3 | C | Not used | 50 | Not formed | 0.4 |

TABLE 3

| | Design capacitance ratio (3 C) [%] | Capacitance retention rate (after one month at 60° C.) |
|---|---|---|
| Example 1 | 98 | 87 |
| Example 2 | 92 | 85 |
| Example 3 | 96 | 80 |
| Example 4 | 95 | 88 |
| Example 5 | 91 | 82 |
| Example 6 | 94 | 88 |
| Comparative Example 1 | 86 | 72 |
| Comparative Example 2 | 88 | 76 |
| Comparative Example 3 | 87 | 78 |

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A battery comprising:
a positive plate and a negative plate each having a collector and an electrode layer disposed on at least one surface of the collector, the electrode layer containing an active material; and
an insulative separator disposed between the positive plate and the negative plate, wherein
at least one of the positive plate and the negative plate has a plurality of cracks generated by drying in a whole area of the electrode layer thereof;
the plurality of cracks are disposed such that a maximum mutual distance between adjacent cracks is 2 to 10 times an average particle diameter of the active material;
the plurality of cracks are disposed such that a total length of the plurality of cracks per unit area is 0.1 to 1.0 cm/cm$^2$ in a planar direction of the at least one of the positive plate and the negative plate; and
all of the plurality of cracks do not extend to the collector.

2. The battery according to claim 1, wherein the cracks are formed by drying the electrode layer at a predetermined drying rate.

3. The battery according to claim 1, wherein the cracks include internal cracks disposed in the inside of the electrode layer.

4. The battery according to claim 1, wherein the electrode layer contains a fibrous conductive material.

5. The battery according to claim 1, wherein the positive plate, the negative plate and the insulative separator are wound to provide a wound electrode body, and the cracks are formed in the electrode layer located at a site from a center turn of the wound electrode body to a predetermined number of turns of the wound electrode body.

6. The battery according to claim 1, wherein the positive plate, the negative plate and the insulative separator are stacked to provide a stacked electrode plate, and the cracks are formed in the electrode layer located at a site from a center layer of the stacked electrode body to a predetermined number of layers of the stacked electrode body.

7. A battery comprising:
a positive plate and a negative plate each having a collector and an electrode layer disposed on at least one surface of the collector, the electrode layer containing an active material; and
an insulative separator disposed between the positive plate and the negative plate, wherein
at least one of the positive plate and the negative plate has a plurality of cracks generated by drying at a part of the electrode layer thereof, the part being apart from a connection of the at least one of the positive plate and the negative plate coupled to an electrode at least by a predetermined distance;
the plurality of cracks are disposed such that a maximum mutual distance between the adjacent cracks is 2 to 10 times an average particle diameter of the active material;
the plurality of cracks are disposed such that a total length of the plurality of cracks per unit area is 0.1 to 1.0 cm/cm$^2$ in a planar direction of the at least one of the positive plate and the negative plate; and
all of the plurality of cracks do not extend to the collector.

8. The battery according to claim 7, wherein the cracks are formed by drying the electrode layer at a predetermined drying rate.

9. The battery according to claim 7, wherein the cracks include internal cracks disposed in the inside of the electrode layer.

10. The battery according to claim 7, wherein the electrode layer contains a fibrous conductive material.

11. The battery according to claim 7, wherein the positive plate, the negative plate and the insulative separator are wound to provide a wound electrode body, and the cracks are formed in the electrode layer located at a site from a center turn of the wound electrode body to a predetermined number of turns of the wound electrode body.

12. The battery according to claim 7, wherein the positive plate, the negative plate and the insulative separator are stacked to provide a stacked electrode plate, and the cracks are formed in the electrode layer located at a site from a center layer of the stacked electrode body to a predetermined number of layers of the stacked electrode body.

* * * * *